H. C. APEL.
Hydrant.

No. 210,394. Patented Dec. 3, 1878.

Attest:
O. R. Erwin
Chas. Beyer

Inventor:
Herman C. Apel
By Jas. B. Erwin
Attorney

UNITED STATES PATENT OFFICE.

HERMAN C. APEL, OF MILWAUKEE, WISCONSIN.

IMPROVEMENT IN HYDRANTS.

Specification forming part of Letters Patent No. 210,394, dated December 3, 1878; application filed July 15, 1878.

*To all whom it may concern:*

Be it known that I, HERMAN C. APEL, of the city of Milwaukee, in the county of Milwaukee and State of Wisconsin, have invented certain new and useful Improvements in Hydrants; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
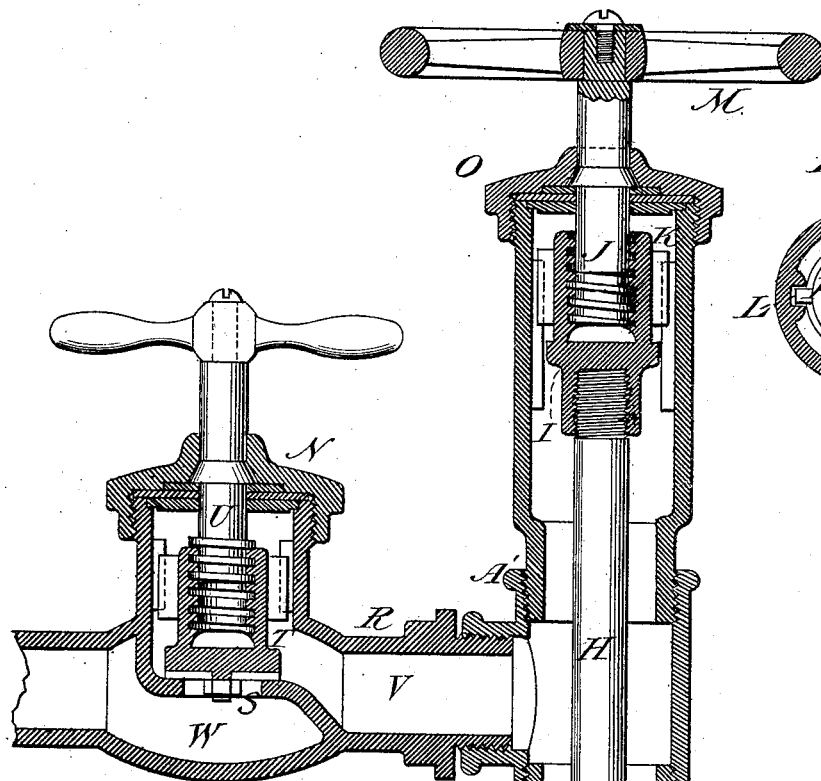
Figure 2:
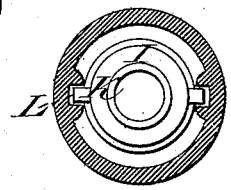
Figure 3:
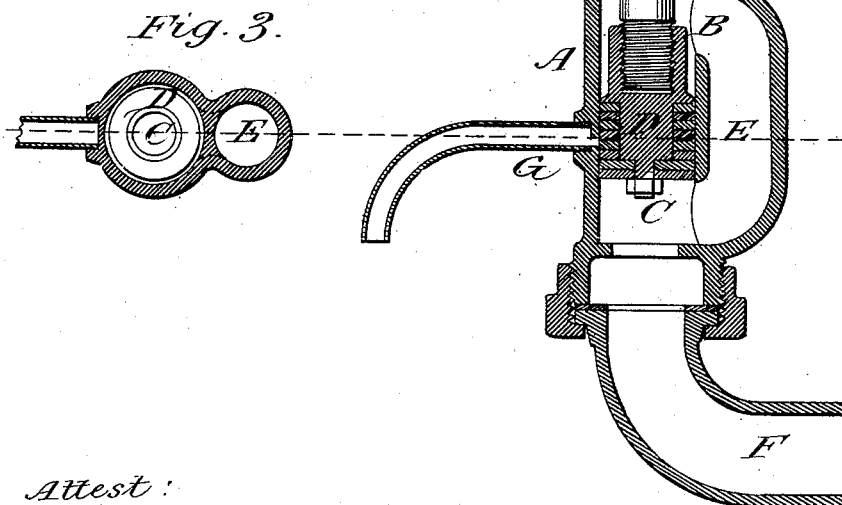

Figure 1 of the accompanying drawings represents a sectional side elevation of my invention. Fig. 2 is an end view of the same.

The object of my invention is to furnish a hydrant from which the valve may be easily withdrawn for repairs and inserted again without taking up the hydrant, which is provided with a waste-pipe for the escape of the water remaining in the same when the inlet-valve is closed, thus preventing the liability of danger in cold weather from being frozen up and broken, and which is so constructed and arranged that the same movement of the valve which opens the inlet closes the waste-pipe, so that there is no waste of water, and also, by a reverse movement of the valve, the inlet is closed and the waste-pipe opened, all of which is further explained by reference to the accompanying drawings, in which—

A represents the valve-chamber, which is divided into two apartments by the wall B, thus leaving apartment C for the accommodation of the valve D, and apartment E for the influx of water when the valve is raised. F is the inlet, which is closed by the downward pressure of the valve D. G is the waste-pipe, which communicates with the chamber A, and is closed by the valve D when it is raised, and is opened when the valve D is pressed downward, thus allowing all the water remaining above it to escape.

The apartment E provides a free passageway for the rapid flow of water around the valve, which is drawn up into its apartment, and thus escapes contact therewith, and is thereby protected from the wear that would otherwise occur by the rapid flow of water against it.

The valve D is constructed in the ordinary manner, and is provided with either or both rubber and leather packing. The wall B serves as a guide to the valve D, to which it is closely fitted, and thus presses the valve firmly against the waste-pipe, by which the waste-pipe is closed.

H is the valve-rod, by which the valve is raised and lowered. The upper end of the valve-rod is provided with a nut, I, which is operated by a screw-bolt, J, which, when turned toward the right, raises the valve and opens it, and which, by a reverse movement of the bolt, is pressed downward and closed. The nut I is provided with flanges K, which operate in slots L, provided for them in the walls of the hydrant, and thus prevent the nut and valve-rod from turning.

M is a wheel, by which the bolt J is turned and the valve operated. R is a pipe, screw-threaded at its inner end to engage with a nut, A′, connecting the upper and lower sections of the pump-cylinder. The pipe R is provided with two ways, V and W, connected together by the orifice S, closed by the valve T, operated by the screw-bolt U, having a handle at its upper end.

When there is no danger from frost, the valve D may be left raised, when water may be drawn off by operating the faucet only.

When desirous to remove the valve for repairs, the cap is unscrewed from the top of the hydrant, when the valve-rod and valve and all its attachments are easily drawn out.

I am aware that it is not new to close the waste-passage simultaneously with opening the discharge-passage of a hydrant.

Having thus described my invention, what I claim as new, and desire to secure by Letters Patent, is—

The combination, with the chamber A, having compartments C E, communicating with each other, and partition B, of the valve D, waste-pipe G, two-way pipe R, having orifice S and valve T, whereby the waste-pipe may be closed and water be drawn when desired from the faucet, as specified.

In testimony that I claim the foregoing as my own I affix my signature in presence of two witnesses.

HERMAN C. APEL.

Witnesses:
 CHAS. A. SCHWAMB,
 JAS. B. ERWIN.